(12) United States Patent
Missotten et al.

(10) Patent No.: US 9,655,301 B2
(45) Date of Patent: May 23, 2017

(54) UNLOADING APPARATUS CONTROLLER FOR AGRICULTURAL HARVESTING MACHINES

(71) Applicant: CNH Industrial America LLC, New Holland, PA (US)

(72) Inventors: Bart M.A. Missotten, Herent (BE); Joachim Boydens, Zedelgem (BE); Bernard Depestel, Beernem (BE); Pieter Vanysacker, Moere (BE); Karel Viaene, Moorslede (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/907,092

(22) PCT Filed: Jul. 24, 2014

(86) PCT No.: PCT/EP2014/065942
§ 371 (c)(1),
(2) Date: Jan. 22, 2016

(87) PCT Pub. No.: WO2015/011237
PCT Pub. Date: Jan. 29, 2015

(65) Prior Publication Data
US 2016/0150733 A1 Jun. 2, 2016

(30) Foreign Application Priority Data

Jul. 24, 2013 (BE) .................................. 2013/0509

(51) Int. Cl.
*A01D 90/00* (2006.01)
*A01D 45/00* (2006.01)
*G06T 7/00* (2006.01)
*A01D 90/10* (2006.01)
(Continued)

(52) U.S. Cl.
CPC .......... *A01D 90/10* (2013.01); *A01D 43/087* (2013.01); *A01D 90/12* (2013.01); *G06T 7/0044* (2013.01);
(Continued)

(58) Field of Classification Search
CPC combination set(s) only.
See application file for complete search history.

(56) References Cited

U.S. PATENT DOCUMENTS 6,943,824 B2   9/2005   Alexia et al.
8,234,047 B2   7/2012   Madsen et al.
(Continued)

FOREIGN PATENT DOCUMENTS

EP    1219153 A2    7/2002
EP    1219159 A1    7/2002

*Primary Examiner* — Yonel Beaulieu
(74) *Attorney, Agent, or Firm* — Patrick M. Sheldrake

(57) ABSTRACT

A controller for a movable unloading apparatus of an agricultural harvesting machine, wherein the movable unloading apparatus directs crop material from the agricultural harvesting machine to a container driven in the vicinity of the agricultural harvesting machine, and wherein the controller receives image data representative of a stream of crop material as it passes from the unloading apparatus to the container; processes the image data in order to determine a shape of the stream of crop material in the image data; and sets an attribute of the unloading apparatus in accordance with the determined shape of the stream of crop material in order to direct the crop material from the unloading apparatus to the container.

14 Claims, 2 Drawing Sheets

(51) Int. Cl.
*A01D 43/08* (2006.01)
*A01D 90/12* (2006.01)
*G06T 7/73* (2017.01)
*G06T 7/50* (2017.01)
*G06T 7/13* (2017.01)

(52) U.S. Cl.
CPC .......... *G06T 7/0051* (2013.01); *G06T 7/0085* (2013.01); *G06T 7/13* (2017.01); *G06T 7/50* (2017.01); *G06T 7/74* (2017.01); *G06T 2207/10028* (2013.01)

(56) References Cited

U.S. PATENT DOCUMENTS

| | | | | |
|---|---|---|---|---|
| 8,428,829 B2 * | 4/2013 | Brunnert | ............ | A01D 43/087 56/10.2 F |
| 8,451,139 B2 * | 5/2013 | Morselli | ............ | A01D 43/086 340/901 |
| 8,626,406 B2 * | 1/2014 | Schleicher | ......... | A01D 41/1278 701/24 |
| 8,649,940 B2 * | 2/2014 | Bonefas | ................. | B62D 12/02 348/143 |
| 8,682,540 B2 * | 3/2014 | Missotten | ............ | A01D 43/087 701/50 |
| 8,868,304 B2 * | 10/2014 | Bonefas | ................. | B65G 67/24 701/117 |
| 9,002,591 B2 * | 4/2015 | Wang | ................. | A01D 41/1278 701/50 |
| 9,119,342 B2 * | 9/2015 | Bonefas | ................. | A01D 34/001 |
| 9,221,186 B2 * | 12/2015 | Scaroni | ................. | B26D 1/143 |
| 9,313,951 B2 * | 4/2016 | Herman | ............... | A01D 43/073 |
| 9,326,443 B2 * | 5/2016 | Zametzer | ............ | A01D 41/127 |
| 9,326,444 B2 * | 5/2016 | Bonefas | ................. | A01D 43/087 |
| 9,345,194 B2 * | 5/2016 | Schroeder | ............ | A01D 41/127 |
| 9,392,746 B2 * | 7/2016 | Darr | .................... | A01D 43/073 |
| 9,408,347 B2 * | 8/2016 | Menke | ................. | A01D 43/073 |
| 2009/0044505 A1 | 2/2009 | Huster et al. | | |

\* cited by examiner

UNLOADING APPARATUS CONTROLLER FOR AGRICULTURAL HARVESTING MACHINES

This application is the US National Stage filing of International Application Serial No. PCT/EP2014/065942 filed on Jul. 24, 2014 which claims priority to Belgian Application BE2013/0509 filed Jul. 24, 2013, each of which is incorporated herein by reference in its entirety.

FIELD OF THE INVENTION

The present disclosure relates to agricultural harvesting machines such as forage harvesters and combine harvesters, and in particular to controllers for movable unloading apparatus of agricultural harvesting machines.

BACKGROUND OF THE INVENTION

In forage harvesters of the above type, control of the spout position and of the position of a pivotable end portion (flap) of the spout on the basis of camera images is known in the art. Patent publication WO-A-2011101458 describes a system in which a 3D camera is arranged on the discharge spout. The camera takes images of the container driving next to the machine. These images define at least two vertical strips. Analysis of these strips provides the position of the front and/or rear wall of the container relative to the camera. Based on this information, the spout is controlled so that the crop material is unloaded in the container.

SUMMARY OF THE INVENTION

According to a first aspect of the invention, there is provided a controller for a movable unloading apparatus of an agricultural harvesting machine, wherein the movable unloading apparatus is configured to direct crop material from the agricultural harvesting machine to a container driven in the vicinity of the agricultural harvesting machine, and wherein the controller is configured to:
  receive image data representative of a stream of crop material as it passes from the unloading apparatus to the container;
  process the image data in order to determine a shape of the stream of crop material in the image data; and
  set an attribute of the unloading apparatus in accordance with the determined shape of the stream of crop material in order to direct the crop material from the unloading apparatus to the container.

In this way, an improved system for automatic filling of the container can be provided that is more robust to wind, which could otherwise cause loss of crop. This can therefore reduce spillage of the crop from the container. Such control can greatly improve the accuracy and reliability of backward filling of containers, in particular because for backward filling the stream of crop material has a longer distance to travel to the container, and therefore is more susceptible to wind influences.

The controller may be configured to determine an orientation of a side edge, optionally two side edges, of the stream of crop material in order to determine the shape of the stream of crop material.

The controller may be configured to perform edge recognition on the image data in order to determine the shape of the stream of crop material.

The image data may comprise depth data relating to the distance between a camera that captures the image data and objects represented by pixels in the image. The controller may be configured to process the depth data in order to determine the shape of the stream of crop material.

The controller may be configured to move the unloading apparatus relative to the agricultural harvesting machine in accordance with the set attribute of the unloading apparatus.

The attribute of the unloading apparatus may comprise one or more of:
  an angular position of the unloading apparatus about a vertical axis;
  an angular position of the unloading apparatus about a horizontal axis; and
  an angular position of a pivotable flap at a distal end of the unloading apparatus.

The controller may be further configured to receive wind speed and/or wind direction information from a wind sensor, and may be configured to set the attribute of the unloading apparatus in accordance with the received wind speed and/or wind direction information and the determined shape of the stream of crop material in order to direct the crop material from the unloading apparatus to the container.

There may be provided an agricultural harvesting machine comprising:
  a moveable unloading apparatus, and
  any controller disclosed herein.

According to a further aspect of the invention, there is provided a method of controlling a movable unloading apparatus of an agricultural harvesting machine to direct crop material from the agricultural harvesting machine to a container driven in the vicinity of the harvesting machine, the method comprising the steps of:
  capturing image data representative of a stream of crop material as it passes from the unloading apparatus to the container;
  processing the image data in order to determine a shape of the stream of crop material in the image data; and
  setting an attribute of the unloading apparatus in accordance with the determined shape of the stream of crop material in order to direct the crop material from the unloading apparatus to the container.

Processing the image data in order to determine the shape of the stream of crop material may comprise determining an orientation of a side edge, and optionally two side edges, of the stream of crop material.

Processing the image data in order to determine the shape of the stream of crop material may comprise performing edge recognition on the image data.

The image data may comprise depth data relating to the distance between a camera that captures the images and objects represented by pixels in the image. The method may comprise processing the depth data in order to determine the shape of the stream of crop material.

The method may further comprise moving the unloading apparatus relative to the agricultural harvesting machine in accordance with the set attribute of the unloading apparatus.

There may be provided a computer program, which when run on a computer, causes the computer to configure any apparatus, including a controller and agricultural harvesting machine disclosed herein or perform any method disclosed herein. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples.

The computer program may be provided on a computer readable medium, which may be a physical computer readable medium such as a disc or a memory device, or may be embodied as a transient signal. Such a transient signal may be a network download, including an internet download.

BRIEF DESCRIPTION OF THE DRAWINGS

Embodiments of the present invention will now be described by way of example and with reference to the accompanying drawings in which.

DETAILED DESCRIPTION OF PREFERRED EMBODIMENTS

One or more embodiments disclosed herein relate to a controller for a discharge spout of an agricultural harvesting machine such as a forage harvester or a combine harvester. The controller can receive and process image data representative of a stream of crop material as it passes from the discharge spout to a container in order to determine a shape of the stream of crop material in the image data. The determined shape is representative of the direction of crop flow and can then be used to direct the discharge spout such that any wind that is blowing the crop material off target can be taken into account. In this way, crop can be more accurately deposited in the container and crop waste can be reduced. Such examples can be particularly advantageous for backward filling of containers as the crop material can be highly influenced by wind.

Figure 1:
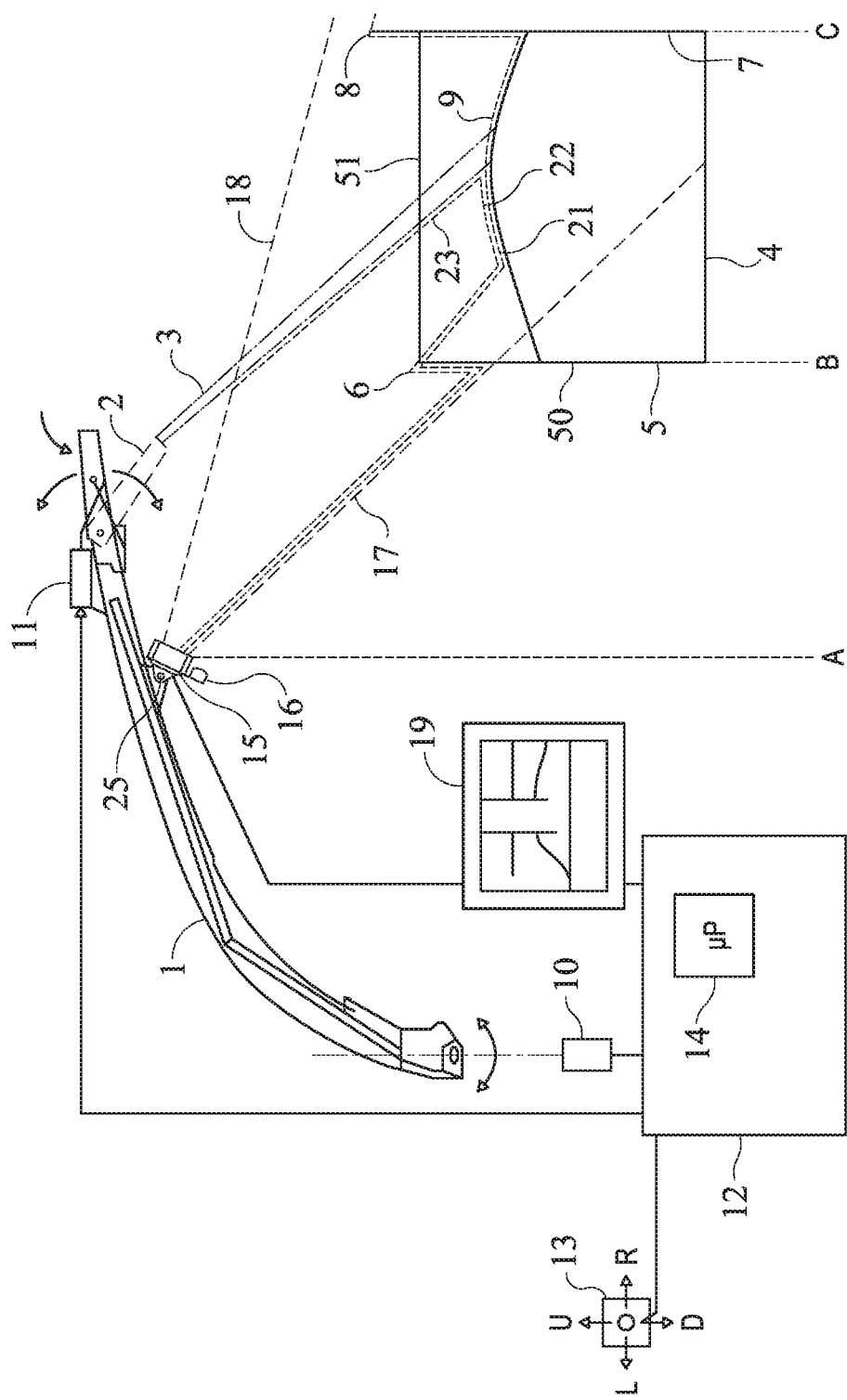
FIG. 1 shows a schematic image of a discharge spout of an agricultural harvesting machine.

FIG. 1 is a schematic image of a discharge spout 1, which is an example of a movable unloading apparatus. The base of the discharge spout 1 is mounted for rotation about a vertical axis and pivoting about a horizontal axis on an agricultural harvesting machine (not shown), in a manner known in the art. The agricultural harvesting machine may be a forage harvester or a combine harvester. The discharge spout 1 is used to direct a stream 3 of processed crop material from the agricultural harvesting machine to a container 4. The container 4 may be driven in the vicinity of the agricultural harvesting machine, for example it may be driven either behind or next to the agricultural harvesting machine.

The container 4 has a near wall 5, closest to the agricultural harvesting machine, and an opposite, remote wall 7. The near wall 5 has an upper border/edge 6 and the remote wall 7 also has an upper border/edge 8. Crop material is deposited into the container 4 from the discharge spout 1 and forms a heap 9 therein.

The base of the discharge spout 1 is equipped with an actuator, for example a hydraulic motor 10, for changing the angular position of the discharge spout 1 about the vertical axis. The discharge spout 1 is also equipped with a further actuator, for example a hydraulic cylinder (not shown), for changing the height of the distal end of the discharge spout 1 by controlling the angle of the discharge spout about the horizontal axis. The discharge spout 1 further has a pivotable flap 2 at its distal end, equipped with a third actuator, for example a linear electrical actuator 11, for changing the angle of the pivotable flap 2 about a horizontal axis. The three actuators are controlled by a controller 12 in order to direct the stream 3 of processed crop material into the container 4. The controller 12 may be governed by a manual control 13 or by a microprocessor 14 that implements any known control algorithm such as the one described in WO-A-2011/101458. Such control will be referred to as a main control methodology.

In this example, a 3-D camera 15 and a light source 16 are mounted on the discharge spout 1, below the pivotable flap 2 as shown in FIG. 1. The camera 15 is configured to produce images 19 as arrays of pixels, and to provide depth data representative of the distance between the camera and objects shown in the image, for each pixel in the image. This distance may be determined on the basis of the well-known time-of-flight principle. The field of the camera is represented in FIG. 1 by the border lines 17 and 18. The light source 16 is preferably a Near Infra Red (NIR) lamp, which emits modulated light with a certain wavelength. Reflected light of the same wavelength is captured by the camera 15.

In other examples a 2-D camera may be used if depth data is not required.

In the example of FIG. 1, the container 4 is shown to one side of the agricultural harvesting machine in order to permit sideways filling. For this reason, the near and remote walls of the container are referred to as two side walls 5, 7. It will be appreciated that in other applications the container 4 can be located behind the agricultural harvesting machine to permit backward filling, in which case a front wall and back wall of the container will be respectively the near and remote walls.

The camera 15 is positioned such that it records images 19 that include the stream 3 of crop material as it passes from the discharge spout 1 to the container 4. The camera 15 can also record images of the crop heap 9 that builds up in the container 4.

One or more features of the container 4 may also be shown in the image 19. The features of the container 4 may be used by the main control methodology to aim the discharge spout 1 at the container 4.

According to an embodiment of the invention, the captured images 19 are processed in order to determine a shape of the stream 3 of crop material such that the discharge spout 1 can be automatically controlled to direct the crop material 3 from the discharge spout 1 to the container 4. The shape of the stream 3 is representative of the direction in which the crop is travelling. In this way crop material can be reliably provided to the container 4 with a reduced level of spillage, especially in windy conditions. This control will be referred to as a crop direction control methodology and can be used to supplement the main control methodology in order to reduce crop spillage. Further details are provided below.

Figure 2:
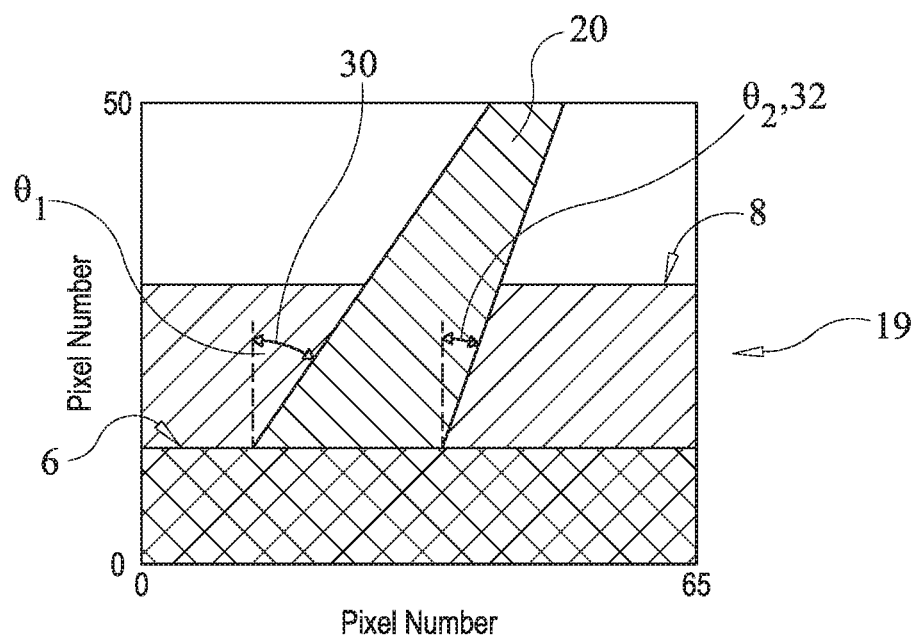
FIG. 2 shows an example of a simplified image 19 that can be taken by the camera of FIG. 1.

FIG. 2 shows an example of a simplified image 19 that can be taken by the camera of FIG. 1. Different shading patterns are used to represent different distances from the camera. The upper border 6 of the near wall is represented in the lower portion of the image 19, while the upper border 8 of the remote wall is represented in the upper portion of the image 19. The image 19 in FIG. 2 is taken while the spout is delivering crop material 20 into the container.

The image 19 of FIG. 2 can be processed in order to determine the shape of the crop material 20. In this example the orientation of the side edges of the crop material 20 is determined in order to establish the direction of the crop flow. The direction of crop flow is affected by wind speed and wind direction.

In one example, standard edge recognition techniques can be used to identify the side edges of the crop material 20 from its surroundings. An edge may be recognised as a depth difference between neigbouring pixels that exceeds a threshold, and can be determined by comparing a first or second derivative of the measured distance values (optionally after filtering) with a threshold. In some examples, such edge recognition techniques can be performed for one or more non-contiguous horizontal rows/strips of pixels in the image data such that the flow edges can be reconstructed from the resultant non-contiguous portions of the flow edge. Processing in this way can reduce the processing burden on the controller, yet still provide an acceptable representation of the flow edges. That is, an edge recognition algorithm can be performed several times for the total height of the flow in order to reconstruct the flow edges.

An edge that relates to the crop material, and not a wall of the container for example, can be recognised by processing the image data representative of the crop flow from the top down and stopping flow edge determination when the container is detected. Examples of detecting containers in image data are known in the art, for example from WO-A-2011/101458, and may form part of the main control methodology. This "top down" approach may be particularly well suited to backward filling as there is likely to be a significant amount of crop flow that is higher than the container. It will be appreciated to the person skilled in the art that there numerous other ways in which the edges of the stream of crop material can be properly identified from the image data.

In some examples an algorithm/logic can be used to track the crop flow from the upper part of image downwards in order to determine the shape of the stream of crop material and hence the direction of flow. The algorithm/logic may exclude lines that are between threshold values that are considered unlikely to reflect the stream of crop material. For example, such thresholds may be −15° and 15° relative to horizontal. In this way an angle limit is used along with a crop tracking algorithm.

An edge of the crop material 20 may be modelled as a straight line that best fits the recognised edge. Also, the image data may contain data on the quality of each generated distance value, such as the light intensity for each position in the image, and filtering may be used to disregard the distance data that have a quality below a predetermined value.

The above edge recognition techniques can be used to determine the shape of the stream 3 of crop material in the plane of the image 19 of FIG. 2.

In the example of FIG. 2 the crop material 20 is subjected to a cross-wind such that it does not flow vertically downwards through the image 19. As shown in FIG. 2, the left-hand edge of the crop material 20 is at an angle of θ1 30 to the vertical and the right-hand edge of the crop material 20 is at an angle of θ2 32 to the vertical. These two angles θ1 30 and θ2 32 may or may not be the same.

In FIG. 2, the two angles θ1 30, θ2 32 of the edges of the crop material 20 are measured clockwise from vertically upwards reference lines that intersect with the respective side edges of the crop material 20. The controller of FIG. 1 can determine that the crop material 20 is subject to a side-wind if the two side edges of the crop material 20 extend in generally the same direction. That is, if the difference between the two angles θ1 30, θ2 32 is less than a threshold, which may be less than or equal to 900. Either or both of the angles θ1 30 and θ2 32 can be used as an indication of the direction of flow of the crop stream 20. For example, an average of θ1 30 and θ2 32 can be used.

In some examples the crop direction control methodology may determine the shape of the crop stream by taking into account the width of the stream in relation to the distance to the camera and/or the distance to the spout. That is, the shape of the crop stream can be more accurately modeled by considering the effect of the distance to the crop stream on the crop stream's appearance.

The controller of FIG. 1 can use the determined shape of flow of the crop stream 20 to automatically control the discharge spout in order to direct the crop material 20 from the discharge spout to the container in accordance with the crop direction control methodology. One or more of the following attributes of the discharge spout 1 can be set by the crop direction control methodology:

1. the angular position of the unloading apparatus about a vertical axis, for example by controlling the hydraulic motor 10. This may be referred to as spout rotation;
2. the angular position of the unloading apparatus about a horizontal axis, for example by controlling the hydraulic cylinder (not shown). This may be referred to as spout elevation; and
3. the angular position of the pivotable flap 2, for example by controlling the linear electrical actuator 11. This may be referred to as flipper angle.

The main control methodology may provide a main control signal to set one or more of the above attributes to a main value. The main control signal may be automatically generated by a main control algorithm or may be responsive to user input. The crop direction control methodology may determine an offset value for one or more of the above attributes in accordance with the direction of flow of the crop stream. The offset values may be added to the corresponding main values in order to control the discharge spout in such a way that takes into account the direction of flow of the crop stream 20, thereby reducing crop waste.

In one example, the crop direction control methodology may be a crop direction control algorithm that uses the determined shape of flow of the crop stream 20 to calculate the offset value. The crop direction control algorithm may or may not apply a linear function. Alternatively, a database or look-up table can be used by the crop direction control methodology to determine the offset value.

In one example, the crop direction control methodology may add or subtract a predetermined angle to the main value for the discharge spout's angular position about its vertical axis for each degree that the direction of the crop stream is offset from the vertical. It will be appreciated that the size of the predetermined angle will be specific to the dimensions of the apparatus involved.

In a further example, the crop direction control methodology can recognise the two side edges of the stream of crop material in the image data and then take an average of both side edges in order to determine a center line of the stream of crop material. This center line is representative of the shape of the stream of crop material. The crop direction control methodology can then determine an intersection point of the center line with the container; the intersection point representing the position where the crop material enters the container. The intersection point can be used as feedback for setting an attribute of the unloading apparatus. For example, the offset for the angular position of the unloading apparatus about a vertical axis can be set in accordance with the determined intersection point. The feedback can also include the distance between the measured center line of the stream of crop material and a theoretic flow line of the crop, which can be the center of the image plus an initial offset.

In some examples, the crop direction control methodology can determine the offset value in accordance with additional measured parameters. Such additional measured parameters can include the height of the pivotable flap 2 above the container 4 and the angle of the pivotable flap 2. For example, the height of the pivotable flap 2 and the angle of the pivotable flap 2 may affect the distance that the crop material travels from the discharge spout 1 before it enters the container 4. Therefore, for higher flaps and flatter angles (that will cause the crop to travel further to the container 4) a larger offset may be applied.

Also, wind speed and direction information may be provided by a wind sensor. This sensor could for example be mounted on the roof or on the discharge spout 1 of the agricultural harvesting machine. The sensor could alternatively be mounted on another nearby vehicle, that is sending real time wind information over a wireless communication channel to the agricultural harvesting machine, or it could be a stationary sensor somewhere in or around the field that is being harvested, sending real time wind information over a wireless communication channel to the agricultural harvesting machine. As a further alternative, the wind information could be received from a local weather forecasting organisation through telematics. Use of a wind sensor can be particularly advantageous if images recorded by the camera 15 on the discharge spout 1 are distorted by dust, which can be a particularly problematic if wind is blowing crop towards the camera 15.

Figure 3:
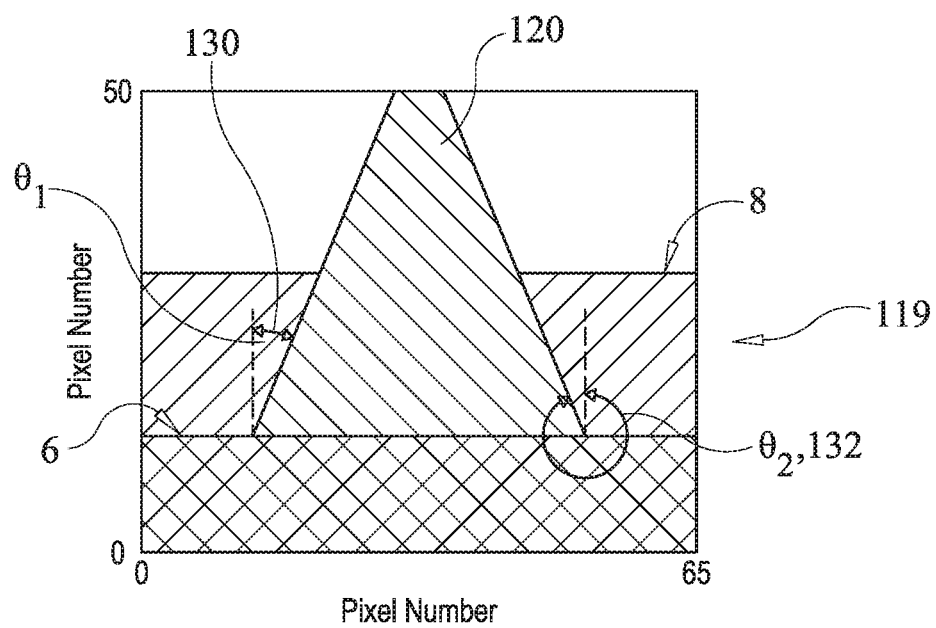
FIG. 3 shows another example of a simplified image 19 that can be taken by the camera of FIG. 1.

FIG. 3 illustrates another example of a simplified image 119 that can be taken by the camera of FIG. 1. In the same way as FIG. 2, a first angle θ1 130 represents the clockwise deviation of the left-hand edge of the crop material 120 from the vertical, and a second angle θ2 132 represents the clockwise deviation of the right-hand edge of the crop material 120 from the vertical. In FIG. 3 the difference between the two angles θ1 130, θ2 132 is greater than 2700, which is indicative of the crop material horizontally spreading out as it exits the unloading apparatus. The crop material 20 may behave this way if it experiences a headwind or a tailwind for example, or may simply be an artefact of backward filling because the crop material 20 may have further to travel, possibly at a flatter angle, and therefore be more susceptible to horizontal spread.

If the controller determines that the angular difference between the two side edges of the crop stream 120 is greater than the threshold (as in FIG. 3), then attributes of the discharge spout are automatically controlled in a similar way to that described above with reference to FIG. 2. In this example, the crop direction control methodology may prioritise the lowering of the angle of the discharge spout about a horizontal axis and/or a lowering of the pivotable flap in order to reduce the distance between the distal end of the discharge spout and the container, thereby reducing the amount that the crop material has spread out by the time it enters the container. This will reduce the likelihood that the crop will spread out to such an extent that some of it misses the container.

In some examples, the crop direction control methodology may determine the direction of the crop stream 120 either into or out of the plane of the image 119 by processing the depth data for the pixels in the image that relate to the crop stream 120.

One or more embodiments disclosed herein relate to an automatic trailer filling system of a forage harvester that uses a 3D camera. The camera looks at the trailer and feeds information the filling algorithm. The filling algorithm makes sure that material is ejected into the trailer. In particular, the filling algorithms disclosed herein can enable material to be deposited into the trailer even when wind is blowing the material sideways. Without the algorithms disclosed herein the material would be blown sideways such it would miss the trailer. That is, methods and apparatus disclosed herein provide a means to counter the effect of wind on material ejected from a discharge spout of an agricultural harvesting machine.

The invention claimed is:

1. A control system for a movable unloading apparatus of an agricultural harvesting machine, wherein the movable unloading apparatus is configured to direct crop material from the agricultural harvesting machine to a container driven in the vicinity of the agricultural harvesting machine, the control system comprising
a controller configured to:
receive image data from a camera, the image data representative of a stream of crop material as it passes from the unloading apparatus to the container;
process the image data and determine therefrom an orientation of at least one side edge of the stream of crop material in order to determine a shape of the stream of crop material in the image data; and
set an attribute of the unloading apparatus in accordance with the determined shape of the stream of crop material in order to direct the crop material from the unloading apparatus to the container.

2. The control system of claim 1, configured to measure in the image data at least one angle of the respective at least one side edge of the stream to determine an orientation of the at least one side edge of the stream of crop material in order to determine the shape of the stream of crop material.

3. The control system of claim 1, configured to perform edge recognition on the image data in order to determine the shape of the stream of crop material.

4. The control system of claim 1, wherein the image data comprises depth data relating to the distance between the camera that captures the image data and objects represented by pixels in the image, and the controller is configured to process the depth data in order to determine the shape of the stream of crop material.

5. The control system of claim 1, configured to move the unloading apparatus relative to the agricultural harvesting machine in accordance with the set attribute of the unloading apparatus.

6. The control system of claim 1, wherein the attribute of the unloading apparatus comprises one or more of:
an angular position of the unloading apparatus about a vertical axis;
an angular position of the unloading apparatus about a horizontal axis; and
an angular position of a pivotable flap at a distal end of the unloading apparatus.

7. The control system of claim 1, further configured to:
receive wind speed and wind direction information from a wind sensor; and
set the attribute of the unloading apparatus in accordance with the received wind speed and wind direction information and the determined shape of the stream of crop material in order to direct the crop material from the unloading apparatus to the container.

8. An agricultural harvesting machine comprising:
a moveable unloading apparatus configured to direct crop material to a container driven in the vicinity of the agricultural harvesting machine,
a control system connected to the moveable unloading apparatus, the control system comprising a controller configured to:

receive image data from a camera, the image data representative of a stream of crop material as it passes from the unloading apparatus to the container;

process the image data and determine an orientation of at least one side edge of the stream to determine a shape of the stream of crop material in the image data; and set an attribute of the unloading apparatus in accordance with the determined shape of the stream of crop material in order to direct the crop material from the unloading apparatus to the container.

9. A method of controlling a movable unloading apparatus of an agricultural harvesting machine to direct crop material from the agricultural harvesting machine to a container driven in the vicinity of the harvesting machine, the method comprising the steps of:

capturing image data representative of a stream of crop material as it passes from the unloading apparatus to the container;

processing the image data in order to determine an orientation of at least one side edge of the stream to determine a shape of the stream of crop material in the image data; and setting an attribute of the unloading apparatus in accordance with the determined shape of the stream of crop material in order to direct the crop material from the unloading apparatus to the container.

10. The method of claim 9, wherein processing the image data in order to determine the shape of the stream of crop material comprises measuring in the image data at least one angle of the respective at least one side edge of the stream and determining a respective orientation of the at least one side edge of the stream of crop material therefrom.

11. The method of claim 9, wherein processing the image data in order to determine the shape of the stream of crop material comprises performing edge recognition on the Image data.

12. The method of claim 9, wherein the image data comprises depth data relating to the distance between the camera that captures the image data and objects represented by pixels in the image, and the method comprises processing the depth data in order to determine the shape of the stream of crop material.

13. The method of claim 9, further comprising moving the unloading apparatus relative to the agricultural harvesting machine in accordance with the set attribute of the unloading apparatus.

14. The method of claim 9, wherein the attribute of the unloading apparatus comprises one or more of:

an angular position of the unloading apparatus about a vertical axis;

an angular position of the unloading apparatus about a horizontal axis; and an angular position of a pivotable flap at a distal end of the unloading apparatus.

* * * * *